United States Patent Office 3,198,751
Patented Aug. 3, 1965

3,198,751
STANNIC OXIDE-ANTIMONY TETROXIDE
CATALYST COMPOSITION
James Robert Bethell and David James Hadley, Epsom Downs, and Barrie Wood, Epsom, England, assignors to The Distillers Company Limited, Edinburgh, Scotland, a British company
No Drawing. Original application Feb. 3, 1960, Ser. No. 6,365, now Patent No. 3,094,565, dated June 18, 1963. Divided and this application Oct. 9, 1962, Ser. No. 229,475
Claims priority, application Great Britain, Feb. 17, 1959, 5,397/59; Mar. 12, 1959, 8,678/59; Apr. 2, 1959, 11,272/59; Apr. 18, 1959, 13,283/59; June 5, 1959, 19,228/59; Oct. 9, 1959, 34,225/59, 34,226/59
1 Claim. (Cl. 252—461)

The present invention relates to the production of unsaturated aliphatic aldehydes, and in particular to the production of acrolein and methacrolein and is a divisional of our prior copending application Serial No. 6,365, filed February 3, 1960, now U.S. Patent 3,094,565.

According to the present invention, the process for the production of acrolein or methacrolein comprises reacting at an elevated temperature in the vapour phase propylene or isobutene with oxygen in the presence of an oxidation catalyst comprising antimony oxide.

The antimony oxide catalyst may be derived from an antimony compound which is partially or completely converted under the reaction conditions to an oxide of antimony. The catalyst may comprise antimony oxide alone or in combination with another polyvalent metal oxide such as an oxide of molybdenum, tungsten, tellurium, copper, titanium or cobalt. Such catalysts may be regarded either as mixtures of antimony oxides with, for instance, molybdenum oxides, or as oxygen-containing compounds of antimony with the other metal, i.e. antimony molybdate. Under the reaction conditions the catalyst may contain either or both forms. Such catalysts may be prepared, for instance, by intimately mixing antimony oxide or hydroxide with the other metal oxide or hydroxide. Alternatively the catalyst may be prepared by precipitation, for instance by adding an aqueous solution of an antimony salt to an aqueous solution or suspension of molybdic acid or a molybdic acid salt, and recovering the resulting precipitate.

The activity of the antimony oxide catalysts is frequently improved by a prior heat-treatment, for instance at a temperature between 500° and 1100° C.

An outstandingly good catalyst comprises (i) a mixture of the oxides of antimony and tin, and/or (ii) a compound of antimony, tin and oxygen, i.e. tin antimonate; under the reaction conditions the catalyst may be present in either or both forms. The catalyst may be prepared in any suitable manner, for instance, by intimately mixing the oxides of antimony and tin. Alternatively, compounds of tin or antimony, such as the hydroxides, which on heating are partially or completely converted to the oxides, may be used. One preferred method of preparing the antimony oxide/tin oxide catalyst comprises making a mixed solution of cationic antimony and tin salts, adding a volatile base such as ammonia to form a precipitate, and recovering and heating the precipitate at a temperature between 500° and 1100° C. Particularly useful catalysts can be prepared in this way from stannous chloride and antimony pentachloride by mixing them together in aqueous media and adding ammonia until the pH is greater than 5.0.

When the tin compound in the mixture is present in its lower valency state, i.e. as a stannous compound, it is particularly preferred to subject the precipitated mixture to a preliminary heat-treatment in an atmosphere comprising oxygen and an inert gas such as nitrogen, carbon dioxide or steam, the proportion of oxygen and the total flow of gas being controlled so that no part of the catalyst during this preliminary heat-treatment exceeds a temperature of 500° C. After this preliminary heat-treatment, the mixture is then subjected to a final heat-treatment in air at a temperature in the range 500° to 1100° C.

Another particularly preferred method of preparing the antimony oxide/tin oxide catalyst comprises intimately mixing stannic oxide with antimony pentoxide and/or antimony tetroxide and heat-treating the resulting mixture. The oxides are preferably made by the action of aqueous nitric acid on the separate metals, and after mixing, the oxides are preferably subjected to a preliminary heat-treatment at about 700°–750° C., and subsequently to a final heat-treatment at a more elevated temperature, for instance up to 1100° C. and preferably between 1000° C. and 1050° C. The preliminary heat treatment is necessary in order to avoid partial fusion and/or volatilisation of the antimony oxides.

The atomic ratio of tin to antimony in the catalysts may vary within moderately wide limits, for instance between 01.1.:1 and 10:1. It is particularly preferred to use tin/antimony catalysts containing substantially no molybdenum or tungsten, or compounds of these metals.

The antimony oxide catalysts used in the process of the present invention may, if desired, be deposited on supports such as alumina or silica.

The reaction of propylene or isobutene with oxygen over the oxidation catalyst may be carried out in any suitable manner, for instance as a fixed bed process, or as a fluidised bed process.

The proportion of olefine in the feed may vary within fairly wide limits, for example between 1 and 20% by volume. It is preferred to use between about 2 and 10% by volume of the olefine. The preferred olefine is propylene.

The concentration of oxygen in the feed may also vary within fairly wide limits for example between 1 and 20% by volume. It is preferred to use between about 2 and 10% by volume of the olefine. The preferred olefine is propylene.

The concentration of oxygen in the feed may also vary within fairly wide limits for example between 1 and 20% by volume and preferably between 2 and 15% by volume. The oxygen may be diluted with inert gases, and may be, for example, supplied as air.

It is preferred to carry out the reaction in the presence, as diluent, of a gas which is substantially inert under the conditions of reaction, for example nitrogen, propane, butane, isobutane, carbon dioxide and steam. It is preferred to use steam or nitrogen or mixtures thereof. The concentration of the steam may vary within wide limits, for instance between 20% and 60% by volume of the feed.

The reaction is carried out at an elevated temperature, preferably between 300 and 500° C.

The contact time may be, for example, in the range 1–30 seconds.

The aldehyde may be recovered from the reaction product by any conventional method, for example by countercurrent extraction with water, preferably at a pH at or below 7, followed by fractional distillation.

The process of the invention is further illustrated by the following examples, in which parts by weight and parts by volume bear the same relation to each other as do grams to millilitres.

*Example 1*

A catalyst was prepared in the following manner:
50.8% by weight of potassium pyroantimonate ($K_2H_2Sb_2O_7 \cdot 4H_2O$) was dissolved in 750 parts by weight of hot water, and 22.6 parts by weight of stannous chloride ($SnCl_2 \cdot 2H_2O$) was dissolved in 50 parts by weight of hot water and 31.5 parts by weight of glacial acetic acid. The two solutions were then mixed together, and the resultant precipitate was filtered off, washed, dried and formed into granules.

The catalyst was placed in a reactor maintained at 360 C., and a gas mixture comprising 11.7% by volume of propylene, 9.8% by volume of oxygen, 38.4% by volume of nitrogen and 40.1% by volume of steam was passed over the catalyst with a contact time of 4 seconds.

11.9% of the propylene fed was converted to acrolein and 3% to carbon dioxide. 84.8% of the propylene was recovered unchanged. The yield of acrolein based on propylene consumed was 78.2%.

*Example 2*

An antimony tungstate catalyst was prepared in the following manner.

Antimony pentoxide (32.35 parts by weight) and tungstic acid (75 parts by weight) were ground together with a small amount of water to form a smooth paste. The resultant mixture was dried, heated in air of 600° C. for 16 hours and formed into pellets. The catalyst was finally heated in air at 650° C. for 5 hours.

The catalyst was placed in a reactor maintained at 460° C. A gas mixture comprising 10% by volume of propylene, 50% of air and 40% of steam was passed over the catalyst. The contact time was 4 seconds. 14% of the propylene fed was converted to acrolein and 5% to carbon dioxide. The yield of acrolein based on propylene consumed was 61%.

*Example 3*

An antimony pentoxide catalyst was placed in a reactor maintained at 370° C. A gas mixture comprising 10% by volume of propylene, 50% by volume of air and 40% of steam was passed over the catalyst. The contact time was 4 seconds. 16% of the propylene fed was converted into acrolein and 4% into carbon dioxide. The yield of acrolein based on propylene consumed was 64%.

*Example 4*

134.7 parts by weight of stannous oxide and 323.5 parts by weight of antimony pentoxide giving an atomic ratio of tin:antimony of 0.5:1 were ground together for 16 hours, mixed to a smooth paste with water, dried, pelleted, and heated in air at 540° C., for 16 hours.

The catalyst was placed in a reactor maintained at 400° C. A gas mixture comprising 10% by volume of propylene, 49.3% by volume of air and 40.6% by volume of steam was passed over the catalyst. The contact time was 4 seconds.

24.9% of the propylene fed was converted to acrolein and 9.0% to carbon dioxide. The yield of acrolein based on propylene consumed was 59.5%.

*Example 5*

150.7 parts by weight of stannic oxide and 80.9 parts by weight of antimony pentoxide were ground to less than 100 mesh B.S.S. and mixed to give a nominal atomic ratio of tin:antimony of 2:1. The mixture was ground together with water to form a smooth paste, dried at 100° C., pelleted, and heated in air at 725° C. for 16 hours.

The catalyst was placed in a reactor maintained at 482° C., and a gas mixture comprising 10.6% by volume of propylene, 49.6% by volume of air and 39.8% by volume of steam was passed over the catalyst. The contact time was 4 seconds.

32% of the propylene fed was converted to acrolein and 4.9% to carbon dioxide. The yield of acrolein based on propylene consumed was 75%.

*Example 6*

111.9 parts by weight of antimony pentachloride were added dropwise to 2,000 parts by weight of vigorously stirred water. When this addition was complete a solution of 45.1 parts by weight of stannous chloride ($SnCl_2 2H_2O$) in 100 parts by weight of 1% hydrochloric acid was added. The mixture was heated to 80° C. and dilute ammonia solution added until the pH was 6.5. After boiling, the precipitate was filtered off, washed by resuspension with 3,000 parts by weight of hot water, refiltered, dried at 120° C. and heated in air at 380° C., for 4 hours. Heating was then continued at 540° C. for 16 hours. The resultant catalyst, which had a tin:antimony atomic ratio of about 0.5:1 was then granulated.

The catalyst was placed in a reactor maintained at 360° C. and a gas mixture comprising 9.9% by volume of propylene, 51.3% by volume of air and 38.9% by volume of steam was passed over the catalyst. The contact time was 4 seconds.

29.0% of the propylene fed was converted to acrolein and 8.1% to carbon dioxide. The yield of acrolein based on propylene consumed was 71.0%.

*Example 7*

A catalyst was prepared as described in Example 6 to give a tin:antimony atomic ratio of about 3:1.

The catalyst was placed in a reactor maintained at 380° C. and a gas mixture comprising 10.1% by volume of propylene, 50.0% by volume of air and 39.9% by volume of steam was passed over the catalyst, the contact time being 4 seconds.

39.3% of the propylene fed was converted to acrolein and 6.9% to carbon dioxide. The yield of acrolein based on propylene consumed was 72.6%.

*Example 8*

300.8 parts by weight of stannous chloride ($SnCl_2 \cdot 2H_2O$)

were dissolved in 300 parts by weight of 1% hydrochloric acid. This solution was added slowly to 3000 parts by weight of vigorously stirred water. Simultaneously, 132.9 parts by weight of antimony pentachloride were added dropwise, giving a tin:antimony atomic ratio of 3:1. When the addition was complete the pH of the mixture was adjusted to between 5 and 5.5 by the addition of dilute ammonia solution. After the addition of 500 parts by weight of water, the mixture was cooled to 24° C. The precipitate was filtered, washed by resuspension in 3000 parts by weight of water and refiltered. The precipitate was dried at 90° C. for 19 hours and granulated. The granules (8–16 mesh B.S.S.) were heated from 350° C. to 450° C. in a stream of nitrogen, before introducing a small flow of air. The flow of air was so adjusted that the temperature of the catalyst did not exceed 490° C. at any point. When the temperature of the catalyst bed had fallen to 450° C. again the nitrogen flow was stopped and air was passed over the granules. The catalyst was then heated at 650° C. for 16 hours.

The catalyst was placed in a reactor maintained at 400° C., and a gas mixture comprising 10.8% by volume of propylene, 51% by volume of air, and 38.2% by volume of steam was passed over the catalyst, the contact time being 4 seconds.

30.5% of the propylene fed was converted into acrolein and 4.5% to carbon dioxide. The yield of acrolein based on propylene consumed was 74%.

*Example 9*

259.6 parts by weight of antimony pentachloride were added dropwise to a vigorously stirred solution of 913 parts by weight of stannic chloride in 3000 parts by weight of water. When the addition was complete the pH of the suspension was adjusted to 5.5 by the addition of concentrated ammonia solution. The temperature of the mixture was raised to 90° C. for 5 minutes, cooled to 25° C. and the precipitate filtered off, washed with water and dried. The catalyst was then heated at 400°

C. to 430° C. in air for 5 hours, pelleted, heated at 725° C. for 16 hours, and finally at 900° C. for 16 hours.

The catalyst was placed in a reactor maintained at 440° C., and a gaseous mixture of propylene (10.5% by volume), air (50.7% by volume), and steam (38.8% by volume) was passed over the catalyst, the contact time being 4 seconds.

Of the propylene fed, 34.8% was converted to acrolein and 6.3% to carbon dioxide. The yield of acrolein based on propylene consumed was 68%.

*Example 10*

190 parts by weight of powdered tin metal were slowly added to a well stirred solution of 800 parts by volume of nitric acid (S.G. 1.42) dissolved in 3200 parts by weight of water. During the addition the acid was maintained at its boiling point. 97.6 parts by weight of powdered antimony metal were added to 400 parts by volume of nitric acid (S.G. 1.42) with stirring. Both acid mixtures were boiled with stirring until no more brown nitrous fumes were evolved. The antimony oxide suspension was then added to the tin mixture and stirred for several minutes. The mixture was filtered, washed with distilled water, dried, and the resulting powder mixed with 2% by weight of graphite and pelleted. The catalyst was then heat-treated at 700° C. for 16 hours, and finally at 1000° C. for 16 hours.

The catalyst was placed in a reactor maintained at 440° C. and a gaseous mixture of 10% by volume of propylene, 70% by volume of air and 20% by volume of steam was passed over the catalyst, the contact time being 4 seconds.

Of the propylene fed, 40.2% was converted to acrolein and 7.5% to carbon dioxide. The yield of acrolein based on propylene consumed was 70.4%. The activity of this catalyst did not decrease after a run of 74 hours.

*Example 11*

A catalyst comprising antimony oxide and tin oxide was prepared as described in Example 10, and was deposited on silica gel.

The catalyst was placed in a reactor maintained at 477° C., and a gaseous mixture consisting of 9.9% by volume of propylene, 51.3% by volume of air and 38.8% by volume of steam was passed over the catalyst, the contact time being 3.9 seconds.

Of the propylene fed, 37.2% was converted to acrolein and 9.4% to carbon dioxide. The yield of acrolein based on propylene consumed was 63.1%.

*Example 12*

Powdered tin (47.5 parts by weight) was added in small portions to a boiling solution of nitric acid (284 parts by weight of concentrated nitric acid in 800 parts by weight of water). Powdered antimony (24.4 parts by weight) was added in small portions to warm concentrated nitric acid (142 parts by weight). Both mixtures were boiled until no further brown nitrous fumes were evolved. While still hot the antimony oxide suspension was added to the tin mixture with stirring, and after 5 minutes the precipitate was filtered off, washed with water and resuspended in 100 parts by weight of water. The mixture was then added to silica gel (22.8 parts by weight of $SiO_2$ in 811 parts by weight of water) and the solids were thoroughly mixed by stirring. The solids were then filtered off, dried, and sieved to give granules of less than 30 mesh B.S.S., and finally heated in air at 800° C. for 16 hours.

34 parts by weight of the catalyst were placed in a ¾ inch diameter reactor maintained at 459° C. The catalyst was fluidized by admitting a gaseous feed of 9.5% by volume of propylene, 49.7% by volume of air and 40.8% by volume of steam at a flow rate of 25,330 parts by volume/hour, measured at N.T.P.

Of the propylene fed 29.7% was converted to acrolein and 11.5% to carbon dioxide. The yield of acrolein based on propylene consumed was 55.3%.

*Example 13*

A catalyst was prepared by intimately mixing 32 parts by weight of tellurium dioxide and 65 parts by weight of antimony pentoxide, firstly as a fine powder and then with the addition of a small amount of water to form a paste. The mixture was dried, pelleted and heat-treated at 450° C. for 16 hours.

The catalyst was placed in a reactor maintained at 402° C., and a gaseous mixture comprising 11.6% by volume of propylene, 49.1% by volume of air and 39.3% by volume of steam was passed over the catalyst, the contact time being 8.6 seconds.

Of the propylene fed, 16.2% was converted to acrolein and 4.4% to carbon dioxide. The yield of acrolein based on propylene consumed was 52.4%.

*Example 14*

A catalyst was prepared by intimately mixing 16 parts by weight of titanium dioxide and 64.6 parts by weight of antimony pentoxide. After pelleting, the catalyst was heat-treated at 540° C. for 16 hours.

The catalyst was placed in a reactor maintained at 423° C. and a gaseous mixture of 11.2% by volume of propylene, 48.1% by volume of air, and 40.7% by volume of steam was passed over the reactor, the contact time being 3.1 seconds.

Of the propylene fed to the reactor, 6.7% was converted to acrolein and 2.7% to carbon dioxide. The yield of acrolein based on propylene consumed was 49.6%.

*Example 15*

A catalyst was prepared by mixing a hot solution of 29.1 parts by weight of cobalt nitrate $(Co(NO_3)_2 \cdot 6H_2O)$ in 100 parts by weight of water with a boiling solution of 50.8 parts by weight of potassium antimonate $(K_2H_2Sb_2O_7 \cdot 4H_2O)$ in 750 parts by weight of water.

The precipitate was filtered off, washed with boiling water, dried and sieved to give 8 to 16 mesh B.S.S. granules.

The catalyst was placed in a reactor maintained at 400° C., and a gaseous mixture of 10.3% by volume of propylene, 52.6% by volume of air, and 37.1% by volume of steam was passed over the catalyst, the contact time being 4 seconds.

Of the propylene fed, 5.8% was converted to acrolein and 5.2% to carbon dioxide. The yield of acrolein based on propylene consumed was 32%.

*Example 16*

A catalyst was prepared by dissolving 127 parts by weight of potassium antimonate in 2,000 parts by weight of boiling water. The solution was cooled to room temperature and mixed with a solution of 60.4 parts by weight of copper nitrate in 500 parts by weight of water. The precipitate was filtered off, washed and dried.

The catalyst was placed in a reactor maintained at 393° C., and a gaseous mixture of 11.1% by volume of propylene, 48.7% by volume of air and 40.2% by volume of steam was passed over the catalyst, the contact time being 3.0 seconds.

Of the propylene fed to the reactor, 8.3% was converted to acrolein and 9.2% to carbon dioxide. The yield of acrolein based on propylene consumed was 39%.

*Example 17*

A solution of 45.1 parts by weight of stannous chloride $(SnCl_2 \cdot 2H_2O)$ in 100 parts by weight 1% hydrochloric acid solution, was mixed with a solution of 119.9 parts by weight of antimony pentoxide in 2,000 parts by weight of water. The mixture was heated to 80° C. and concentrated ammonia was then added to bring the pH to 6.5. After boiling the mixture, the precipitate was filtered off, washed with hot water, dried, heated in air at 385° C. for 3 hours, and finally heated at 540° C. for 16 hours. The catalyst was then sieved to give 8–16 mesh B.S.S. granules.

The catalyst was placed in a reactor maintained at 309° C., and a gaseous mixture of 10% by volume of isobutene, 50% by volume of air, and 40% by volume of steam was passed over the catalyst, the contact time being 4 seconds.

Of the isobutene fed, 9.8% was converted to methacrolein and 6.8% to carbon dioxide. The yield of methacrolein based on isobutene consumed was 23%.

Example 18

104.8 parts by weight of antimony pentachloride, were added to 1500 parts by weight of water with stirring, and at the same time a solution of 61.45 parts by weight of stannic chloride ($SnCl_4.5H_2O$) in 100 parts by weight of 1% hydrochloric acid solution was added dropwise. When the addition was complete, the mixture was heated to 96° C. for 5 minutes, cooled to 22° C. and diluted with 500 parts by weight of water. The pH was then adjusted to 5.1 with dilute ammonia solution. The precipitate was filtered off, washed in water, dried, heated in a stream of air at 380° C. for 2 hours and finally at 540° C. for 16 hours. The catalyst was then sieved to give 8–16 mesh B.S.S. granules.

The catalyst was placed in a reactor maintained at 334° C., and a gaseous mixture of 10% by volume of isobutene, 50% by volume of air, and 40% by volume of steam was passed over the catalyst, the contact time being 4 seconds.

Of the isobutene fed, 12.8% was converted to methacrolein and 6.8% to carbon dioxide. The yield of methacrolein based on isobutene consumed was 40%.

Example 19

A catalyst was prepared by intimately mixing 16 parts by weight of titanium dioxide ($TiO_2$) and 64.8 parts by weight of antimony pentoxide. After being pelleted, the catalyst was heated in air at 540° C. for 16 hours before use.

The catalyst was placed in a reactor maintained at 405° C. and a gaseous mixture of 10% by volume of isobutene, 50% by volume of air, and 40% by volume of steam was passed over the catalyst, the contact time being 3 seconds.

Of the isobutene fed, 5.5% was converted to methacrolein and 1.2% to carbon dioxide. The yield of methacrolein based on isobutene consumed was 36%.

Example 20

A catalyst was prepared by mixing a solution of 105.2 parts by weight of potassium m-antimonate ($KSbO_3.3H_2O$) in 1500 parts by volume of hot water with a solution of 48.3 parts by weight of cupric nitrate ($Cu(NO_3)_2.3H_2O$) in 200 parts by volume of water. After maintaining the mixture at 70° C. for 30 minutes, the precipitate of copper antimonate was filtered off and washed twice with hot water. The precipitate was finally dried in air and sieved to 8 to 16 mesh B.S.S. before use.

The catalyst was placed in a reactor maintained at 345° C. and a gaseous mixture of 10% by volume of isobutene, 50% by volume of air and 40% by volume of steam, was passed over the catalyst, the contact time being 4 seconds.

Of the isobutene fed, 12.4% was converted to methacrolein and 3.1% to carbon dioxide. The yield of methacrolein based on isobutene consumed was 55%.

Example 21

The process of example 20 was repeated using a cobalt antimonate catalyst prepared by precipitation from mixed solutions of cabaltous nitrate and potassium m-antimonate. The reaction temperature was 394° C.

Of the isobutene fed, 12.1% was converted to methacrolein and 4.1% to carbon dioxide. The yield of methacrolein based on isobutene consumed was 51%.

Example 22

144 parts by weight of molybdenum trioxide ($MoO_3$) were intimately mixed with 323.5 parts by weight of antimony pentoxide, first as dry powders and then as a wet paste with a little water. The mixture was dried, sieved to 30 to 60 mesh B.S.S. pelleted and heated in air at 540° C. for 16 hours.

The catalyst was placed in a reactor maintained at 424° C. and a gaseous mixture of 10% by volume of isobutene, 50% by volume of air and 40% by volume of steam was passed over the catalyst, the contact time being 2 seconds.

Of the isobutene fed, 21% was converted to methacrolein, and 4.9% to carbon dioxide. The yield of methacrolein based on isobutene consumed was 56%.

Example 23

The process of Example 22 was repeated using a propylene feed.

Of the propylene fed to the reactor, 12.2% was converted to acrolein and 6% to carbon dioxide. The yield of acrolein based on propylene consumed was 41.3%.

By way of comparison with the above examples, a process was carried out in which a feed of 10% by volume of propylene, 50% by volume of air, and 40% by volume of steam was passed over a stannic oxide catalyst maintained in a reactor at 360° C., the contact time being 4 seconds.

Of the propylene fed, 1.9% was converted to acrolein and 6.5% to carbon dioxide.

The yield of acrolein based on propylene consumed was 16%.

We claim:

A catalyst consisting essentially of a mixture of stannic oxide with antimony tetroxide, the atomic ratio of tin to antimony in said catalyst being from about 0.1:1 to about 10:1.

References Cited by the Examiner

UNITED STATES PATENTS

| | | | |
|---|---|---|---|
| 1,661,826 | 3/28 | Hessle | 252—461 X |
| 2,250,415 | 7/41 | Burk et al. | 265—464 X |
| 2,360,689 | 10/44 | Kipper | 252—461 X |
| 2,410,044 | 10/46 | Burk et al. | 252—464 X |
| 2,638,455 | 5/53 | Pitzer | 252—464 X |
| 2,668,142 | 2/54 | Strecker et al. | 252—464 X |
| 2,783,185 | 2/57 | Hughes et al. | 252—464 X |
| 3,013,089 | 12/61 | Estes et al. | 252—464 X |
| 3,094,552 | 6/63 | Wood | 252—461 X |

FOREIGN PATENTS

| | | |
|---|---|---|
| 718,723 | 11/54 | Great Britain. |

MAURICE A. BRINDISI, *Primary Examiner.*

UNITED STATES PATENT OFFICE
CERTIFICATE OF CORRECTION

Patent No. 3,198,751                                                            August 3, 1965

James Robert Bethell et al.

It is hereby certified that error appears in the above numbered patent requiring correction and that the said Letters Patent should read as corrected below.

Column 2, line 22, for "01.1.:1" read -- 0.1:1 --; column 3, line 22, for "of 600° C." read -- at 600° C. --; line 74, for "111.9" read -- 119.9 --; column 6, line 10, for "450° C." read -- 540° C. --; column 8, line 8, for "cabaltous" read -- cobaltous --.

Signed and sealed this 18th day of January 1966.

(SEAL)
Attest:

ERNEST W. SWIDER                                        EDWARD J. BRENNER
Attesting Officer                                            Commissioner of Patents